(12) United States Patent
Eckel et al.

(10) Patent No.: US 8,530,551 B2
(45) Date of Patent: Sep. 10, 2013

(54) FLAME-RETARDANT IMPACT-MODIFIED BATTERY BOXES BASED ON POLYCARBONATE I

(75) Inventors: Thomas Eckel, Dormagen (DE); Ulrich Grosser, Kürten (DE); Claus Rüdiger, Krefeld (DE); Achim Feldermann, Düesseldorf (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/239,526

(22) Filed: Sep. 22, 2011

(65) Prior Publication Data

US 2012/0074617 A1 Mar. 29, 2012

(30) Foreign Application Priority Data

Sep. 24, 2010 (DE) .......................... 10 2010 041387

(51) Int. Cl.
*C08K 5/523* (2006.01)

(52) U.S. Cl.
USPC ............................ 524/127; 524/140; 524/141

(58) Field of Classification Search
USPC .......................................... 524/127, 140, 141
See application file for complete search history.

(56) References Cited

U.S. PATENT DOCUMENTS

| | | | | |
|---|---|---|---|---|
| 6,140,399 A * | 10/2000 | Munro | ........................... | 524/127 |
| 6,423,766 B1 | 7/2002 | Itagaki | | |
| 6,706,788 B2 * | 3/2004 | Eckel et al. | ................... | 524/127 |
| 7,019,057 B2 | 3/2006 | Seidel et al. | | |
| 2002/0115761 A1 | 8/2002 | Eckel et al. | | |
| 2004/0176505 A1 | 9/2004 | Seidel et al. | | |
| 2010/0160508 A1 | 6/2010 | Taschner et al. | | |

FOREIGN PATENT DOCUMENTS

| | | |
|---|---|---|
| DE | 10 2008 062945 | 6/2010 |
| EP | 0 635 547 | 1/1995 |
| JP | 8 259791 | 10/1996 |
| JP | 2008 280491 | 11/2008 |
| JP | 2009 007487 | 1/2009 |
| WO | 02/46305 | 6/2002 |
| WO | 2004/069914 | 8/2004 |

OTHER PUBLICATIONS

Kurokawa, Haruhiko "Aromatic Polycarbonate Compositions Containing Vinyl Compound-Grafted Silicone-Poly[alkyl (meth)acrylate] Rubbers, their Moldings, and Manufacture of Moldings", Database Accession No. 150:99734, (2009) XP002664151.
International Search Report and Written Opinion of PCT/EP2011/066313, dated Jul. 12, 2011.

* cited by examiner

*Primary Examiner* — Peter Szekely
(74) *Attorney, Agent, or Firm* — Baker Donelson; Bearman Caldwell & Berkowitz PC

(57) ABSTRACT

Battery box comprising compositions containing A) 70.0 to 90.0 parts by weight of linear and/or branched aromatic polycarbonate and/or aromatic polyester carbonate, B) 6.0 to 15.0 parts by weight of at least one graft polymer, C) 2.0 to 15.0 parts by weight of one or more phosphorus compounds, D) 0 to 3.0 parts by weight of antidripping agents, E) 0 to 3.0 parts by weight of thermoplastic vinyl (co)polymer (E.1) and/or polyalkylene terephthalate (E.2), and F) 0 to 20.0 parts by weight of further additives, wherein the compositions are optionally free from rubber-free polyalkyl(alkyl)acrylate.

9 Claims, 2 Drawing Sheets

FIG. 1A
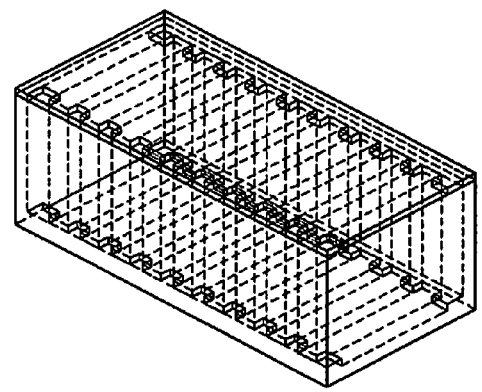
Fig 1B:
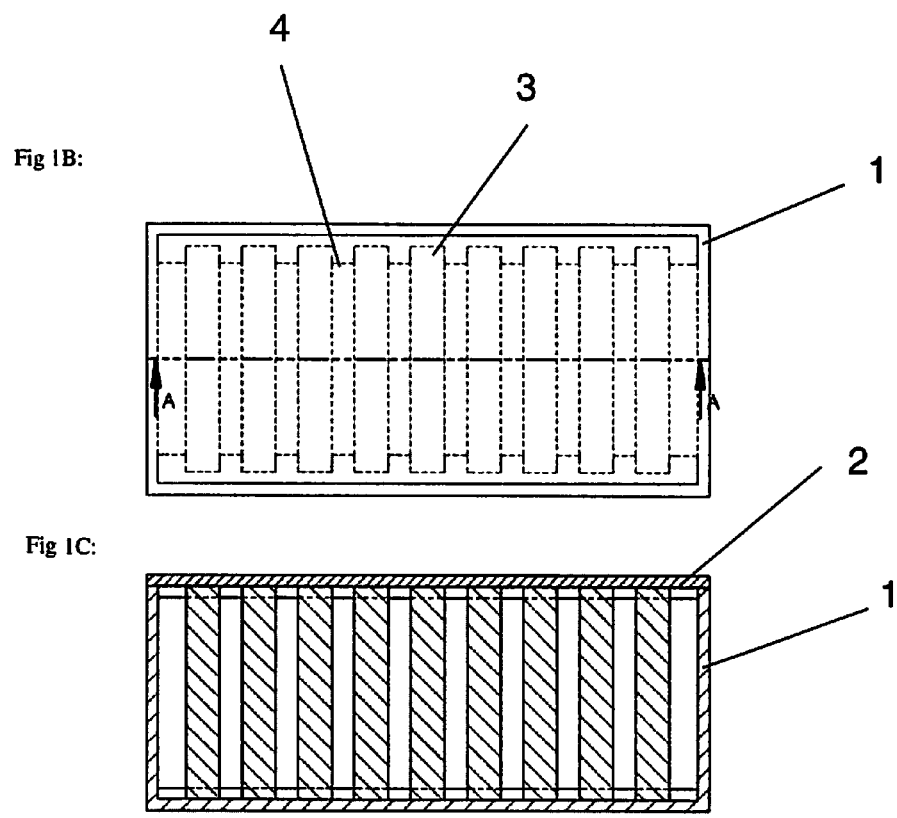
Fig 1C:

FLAME-RETARDANT IMPACT-MODIFIED BATTERY BOXES BASED ON POLYCARBONATE I

CROSS REFERENCE TO RELATED APPLICATIONS

This application claims priority to German Patent Application 10 2010 041387.9 filed Sep. 24, 2010, the contents of which are hereby incorporated by reference in its entirety.

BACKGROUND

1. Field of the Invention

The present invention relates to flame-retardant impact-modified battery boxes based on polycarbonate, which contain a silicone-acrylate composite rubber as graft polymer and a phosphorus-containing flame retardant and which have high impact resistance at low temperatures, good flame resistance with low wall thicknesses and excellent chemical resistance. The present invention also relates to the use of the polycarbonate compositions according to the invention to produce battery boxes.

2. Description of Related Art

WO-A 2004/069914 discloses flame-retardant polycarbonate compositions which contain polyalkyl(alkyl)acrylate and halogen-free oligophosphates and are free from polymers whose synthesis involves butadiene, styrene or acrylonitrile. The compositions are characterised by good weld line strength, chemical resistance, heat resistance, ultimate elongation and flowability. The compositions of the present invention differ from the compositions according to WO-A 2004/069914 in that the compositions according to the invention contain no rubber-free polyalkyl(alkyl)acrylate.

WO-A 2002/046305 discloses impact-modified, flame-retardant polycarbonate compositions containing polycarbonate, impact modifier, phosphorus-containing flame retardants. The compositions are characterised by an improved notched impact strength in the low-temperature range. However, WO-A 2002/046305 discloses no compositions containing an impact modifier having a graft base consisting of silicone-acrylate composite rubber.

EP-A 635547 discloses flame-retardant polycarbonate compositions containing polycarbonate, a copolymer gel, an impact modifier based on acrylate or diene rubber, a flame retardant such as for example oligophosphate and optionally an impact modifier having a graft base consisting of diene rubber, acrylate rubber or EPDM rubber. However, EP-A 635547 discloses no compositions containing an impact modifier having a graft base consisting of silicone-acrylate composite rubber.

U.S. Pat. No. 6,423,766 discloses flame-retardant polycarbonate compositions with an impact modifier having a graft base consisting of silicone-acrylate composite rubber, the weight ratio of impact modifier to phosphorus from the phosphate being between 2 and 15. The compositions have improved mechanical properties and good processing characteristics. The compositions according to the present invention differ from the compositions according to U.S. Pat. No. 6,423,766 in that the compositions according to the invention have a higher weight ratio of impact modifier to phosphorus from the phosphate.

However, none of the documents cited describes battery boxes having the properties according to the invention or the use of the compositions according to the invention for the production of battery boxes.

SUMMARY

An object of the present invention was therefore to provide polycarbonate compositions for the production of battery boxes and the battery boxes themselves, which have high impact resistance at low temperatures, good flame resistance with low wall thicknesses and excellent chemical resistance, battery boxes within the meaning of the present invention also encompassing boxes for static and mobile rechargeable power sources such as rechargeable batteries and capacitors.

Surprisingly it was found that battery boxes based on polycarbonate compositions containing A) 70.0 to 90.0 parts by weight, preferably 75.0 to 88.0 parts by weight, particularly preferably 77.0 to 85.0 parts by weight (relative to the sum of parts by weight of components A+B+C) of linear and/or branched aromatic polycarbonate and/or aromatic polyester carbonate, B) 6.0 to 15.0 parts by weight, preferably 7.0 to 13.0 parts by weight, particularly preferably 9.0 to 11.0 parts by weight (relative to the sum of parts by weight of components A+B+C) of at least one graft polymer comprising B.1 5 to 40 wt. %, preferably 5 to 30 wt. %, particularly preferably 10 to 20 wt. % (relative in each case to the graft polymer B) of a shell consisting of at least one vinyl monomer and B.2 95 to 60 wt. %, preferably 95 to 70 wt. %, particularly preferably 80 to 90 wt. % (relative in each case to the graft polymer B) of one or more graft bases consisting of silicone-acrylate composite rubber, C) 2.0 to 15.0 parts by weight, preferably 3.0 to 13.0 parts by weight, particularly preferably 4.0 to 11.0 parts by weight (relative to the sum of parts by weight of components A+B+C) of phosphorus compounds selected from the groups of monomeric and oligomeric phosphates and phosphonates, phosphonate amines, phosphazenes and phosphinates, wherein mixtures of several components selected from one or more of these groups can also be used as flame retardants, D) 0 to 3.0 parts by weight, preferably 0.01 to 1.00 parts by weight, particularly preferably 0.1 to 0.6 parts by weight (relative to the sum of parts by weight of components A+B+C) of antidripping agents, E) 0 to 3.0 parts by weight, preferably 0 to 1.0 parts by weight (relative to the sum of parts by weight of components A+B+C) of thermoplastic vinyl (co)polymer (E.1) and/or polyalkylene terephthalate (E.2), the composition particularly preferably being free from thermoplastic vinyl (co)polymers (E.1) and/or polyalkylene terephthalates (E.2), and F) 0 to 20.0 parts by weight, preferably 0.1 to 10.0 parts by weight, particularly preferably 0.2 to 5.0 parts by weight (relative to the sum of parts by weight of components A+B+C) of further additives, wherein the compositions are preferably free from rubber-free polyalkyl(alkyl)acrylate and wherein all stated parts by weight in the present application are standardised such that the sum of parts by weight of components A+B+C in the composition is 100, have the desired range of properties.

BRIEF DESCRIPTION OF THE DRAWINGS

Examples of battery boxes according to the invention are illustrated in FIGS. 1 and 2.

FIG. 1A shows a battery box for flat battery cells with a gap between the insertion slots for the flat cells, in which a coolant can be placed or in which a coolant circulates.

FIG. 1B shows a top view of the battery box for flat battery cells.

FIG. 1C shows a cross-sectional view (cross-section AA) through the battery box for flat battery cells.

DETAILED DESCRIPTION OF A PREFERRED EMBODIMENT

Component A

Figure 2A:
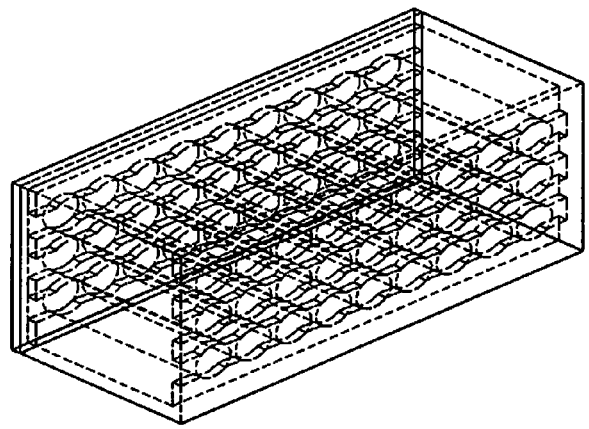
FIG. 2A shows a battery box for cylindrical battery cells with a gap between the insertion slots for the cylindrical cells, in which a coolant can be placed or in which a coolant circulates.

Aromatic polycarbonates and/or aromatic polyester carbonates according to component A which are suitable according to the invention are known from the literature or can be produced by methods known from the literature (regarding the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; regarding the production of aromatic polyester carbonates see for example DE-A 3 077 934).

Aromatic polycarbonates are produced for example by reacting diphenols with carbonic acid halides, preferably phosgene, and/or with aromatic dicarboxylic acid dihalides, preferably benzene dicarboxylic acid dihalides, by the interfacial polycondensation process, optionally using chain terminators, for example monophenols, and optionally using trifunctional or higher-functional branching agents, for example triphenols or tetraphenols. Production via a melt polymerisation process by reacting diphenols with diphenyl carbonate, for example, is also possible.

Diphenols for producing the aromatic polycarbonates and/or aromatic polyester carbonates are preferably those of formula (I)

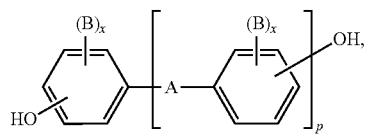

in which

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic optionally heteroatom-containing rings can be fused, or a radical of formula (II) or (III)

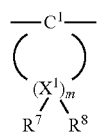

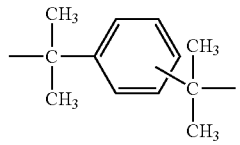

B is in each case $C_1$ to $C_{12}$ alkyl, preferably methyl, halogen, preferably chlorine and/or bromine x is in each case independently 0, 1 or 2, p is 1 or 0, and $R^7$ and $R^8$ can be selected individually for each $X^1$ and independently of each other denote hydrogen or $C_1$ to $C_6$ alkyl, preferably hydrogen, methyl or ethyl, $X^1$ denotes carbon and m denotes a whole number from 4 to 7, preferably 4 or 5, with the proviso that on at least one $X^1$ atom $R^7$ and $R^8$ are both alkyl.

Preferred diphenols are hydroquinone, resorcinol, dihydroxydiphenols, bis-(hydroxyphenyl) $C_1$-$C_5$ alkanes, bis-(hydroxyphenyl) $C_5$-$C_6$ cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)diisopropyl benzenes and the ring-brominated and/or ring-chlorinated derivatives thereof.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)cyclohexane, 1,1-bis-(4-hydroxyphenyl)-3.3.5-trimethylcyclohexane, 4,4'-dihydroxydiphenylsulfide, 4,4'-dihydroxydiphenylsulfone and the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-Bis-(4-hydroxyphenyl)propane (bisphenol A) is preferred in particular.

The diphenols can be used alone or in any combination. The diphenols are known from the literature or can be obtained by methods known from the literature.

Suitable chain terminators for the production of the thermoplastic, aromatic polycarbonates are for example phenol, p-chlorophenol, p-tert-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols having in total 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol %, relative to the molar sum of the individual diphenols used.

The thermoplastic, aromatic polycarbonates have average weight-average molecular weights ($M_w$, measured for example by GPC, ultracentrifuge or light-scattering measurement) of 10,000 to 200,000 g/mol, preferably 15,000 to 80,000 g/mol, particularly preferably 24,000 to 32,000 g/mol.

The thermoplastic, aromatic polycarbonates can be branched in a known manner, and preferably by the incorporation of 0.05 to 2.0 mol %, relative to the sum of diphenols used, of trifunctional or higher-functional compounds, for example those having three or more phenolic groups.

Both homopolycarbonates and copolycarbonates are suitable. For the production of copolycarbonates according to component A of the invention, 1 to 25 wt. %, preferably 2.5 to 25 wt. %, relative to the total amount of diphenols to be used, of polydiorganosiloxanes having hydroxyaryloxy end groups can also be used. These are known (U.S. Pat. No. 3,419,634) and can be produced by methods known from the literature. The production of copolycarbonates containing polydiorganosiloxanes is described in DE-A 3 334 782.

Preferred polycarbonates in addition to the bisphenol A homopolycarbonates are the copolycarbonates of bisphenol A having up to 15 mol %, relative to the molar sums of diphenols, of other diphenols cited as being preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and naphthalene-2,6-dicarboxylic acid.

Mixtures of the diacid dichlorides of isophthalic acid and terephthalic acid in the ratio between 1:20 and 20:1 are particularly preferred.

A carbonic acid halide, preferably phosgene, is additionally incorporated in the production of polyester carbonates as a bifunctional acid derivative.

In addition to the monophenols already mentioned, the chloroformic acid esters thereof and the acid chlorides of aromatic monocarboxylic acids, which can optionally be substituted by $C_1$ to $C_{22}$ alkyl groups or by halogen atoms, and aliphatic $C_2$ to $C_{22}$ monocarboxylic acid chlorides are also suitable as chain terminators for the production of the aromatic polyester carbonates.

The amount of chain terminators in each case is 0.1 to 10 mol %, relative in the case of phenolic chain terminators to mols of diphenol and in the case of monocarboxylic acid chloride chain terminators to mols of dicarboxylic acid dichloride.

The aromatic polyester carbonates can also contain incorporated aromatic hydroxycarboxylic acids. The aromatic polyester carbonates can be both linear and branched in a known manner (see DE-A 2 940 024 and DE-A 3 007 934 in this respect).

Trifunctional or higher-functional carboxylic acid chlorides, such as trimesic acid trichloride, cyanuric acid trichloride, 3,3'-,4,4'-benzophenone tetracarboxylic acid tetrachloride, 1,4,5,8-naphthalene tetracarboxylic acid tetrachloride or pyromellitic acid tetrachloride, in amounts from 0.01 to 1.0 mol % (relative to dicarboxylic acid dichlorides used), or trifunctional or higher-functional phenols, such as phloroglucinol, 4,6-dimethyl-2,4,6-tri-(4-hydroxyphenyl)hept-2-ene, 4,6-dimethyl-2,4-6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis[4,4-bis-(4-hydroxy-phenyl)cyclohexyl]propane, 2,4-bis-(4-hydroxyphenyl isopropyl)phenol, tetra-(4-hydroxyphenyl)methane, 2,6-bis-(2-hydroxy-5-methylbenzyl)-4-methyl phenol, 2-(4-hydroxyphenyl)-2-(2,4-dihydroxyphenyl)propane, tetra-(4-[4-hydroxyphenyl isopropyl]phenoxy)methane, 1,4-bis-[4,4'-dihydroxytriphenyl)methyl]benzene, in amounts from 0.01 to 1.00 mol %, relative to diphenols used, can be used for example as branching agents. Phenolic branching agents can be added with the diphenols, acid chloride branching agents can be introduced together with the acid dichlorides.

The proportion of carbonate structural units in the thermoplastic, aromatic polyester carbonates can vary as required. The proportion of carbonate groups is preferably up to 100 mol %, in particular up to 80 mol %, particularly preferably up to 50 mol %, relative to the sum of ester groups and carbonate groups. Both the ester and the carbonate component of the aromatic polyester carbonates can be present in the form of blocks or be randomly distributed in the polycondensate.

The relative solution viscosity ($\eta_{rel}$) of the aromatic polycarbonates and polyester carbonates is in the range from 1.18 to 1.40, preferably 1.20 to 1.32 (measured in solutions of 0.5 g polycarbonate or polyester carbonate in 100 ml methylene chloride solution at 25° C.).

The thermoplastic, aromatic polycarbonates and polyester carbonates can be used alone or in any combination.

Component B

The graft polymers B are produced by radical polymerisation, for example by emulsion, suspension, solution or bulk polymerisation, preferably by emulsion polymerisation.

Suitable monomers B.1 are vinyl monomers such as vinyl aromatics and/or ring-substituted vinyl aromatics (such as styrene, α-methylstyrene, p-methylstyrene, p-chlorostyrene), methacrylic acid ($C_1$-$C_8$) alkyl esters (such as methyl methacrylate, ethyl methacrylate, 2-ethylhexyl methacrylate, allyl methacrylate), acrylic acid ($C_1$-$C_8$) alkyl esters (such as methyl acrylate, ethyl acrylate, n-butyl acrylate, t-butyl acrylate), organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenyl maleinimide). These vinyl monomers can be used alone or in mixtures of at least two monomers.

Preferred monomers B.1 are selected from at least one of the monomers styrene, α-methylstyrene, methyl methacrylate, n-butyl acrylate and acrylonitrile. Methyl methacrylate is particularly preferably used as the monomer B.1.

The glass transition temperature of the graft base B.2 is <10° C., preferably <0° C., particularly preferably <−20° C. The graft base B.2 generally has an average particle size ($d_{50}$ value) of 0.05 to 10 µm, preferably 0.06 to 5 µm, particularly preferably 0.08 to 1 µm.

The glass transition temperatures are determined by dynamic differential scanning calorimetry (DSC) in accordance with the standard DIN EN 61006 at a heating rate of 10 K/min with definition of $T_g$ as the mid-point temperature (tangent method).

The average particle size $d_{50}$ is the diameter above and below which respectively 50 wt. % of the particles lie. It can be determined by ultracentrifuge measurement (W. Scholtan, H. Lange, Kolloid-Z. and Z. Polymere 250 (1972), 782-796).

Silicone-acrylate composite rubber is used according to the invention as the graft base B.2. These silicone-acrylate composite rubbers are preferably composite rubbers having graft-active sites containing 10 to 90 wt. %, preferably 30 to 85 wt. %, of the silicon rubber component and 90 to 10 wt. %, preferably 70 to 15 wt. %, of the polyalkyl (meth)acrylate rubber component, wherein the two cited rubber components interpenetrate in the composite rubber such that they cannot be substantially separated from each other.

If the proportion of the silicone rubber component in the composite rubber is too high, the finished resin compositions have disadvantageous surface properties and reduced pigmentability. If on the other hand the proportion of the polyalkyl (meth)acrylate rubber component in the composite rubber is too high, the impact resistance of the finished resin composition is disadvantageously influenced.

Silicone-acrylate composite rubbers are known and are described for example in U.S. Pat. No. 5,807,914, EP 430134 and U.S. Pat. No. 4,888,388.

Suitable silicone rubber components B.2.1 of the silicone-acrylate composite rubbers according to B.2 are silicone rubbers having graft-active sites, the production method for which is described for example in U.S. Pat. No. 2,891,920, U.S. Pat. No. 3,294,725, DE-OS 3 631 540, EP 249964, EP 430134 and U.S. Pat. No. 4,888,388.

The silicone rubber according to B.2.1 is preferably produced by emulsion polymerisation, wherein siloxane monomer units, crosslinking or branching agents (IV) and optionally grafting agents (V) are used.

Dimethyl siloxane or cyclic organosiloxanes having at least 3 ring members, preferably 3 to 6 ring members, are preferably used by way of example as siloxane monomer units, such as preferably and by way of example hexamethylcyclotrisiloxane, octamethylcyclotetrasiloxane, decamethylcyclopentasiloxane, dodecamethylcyclohexasiloxane, trimethyl triphenylcyclotrisiloxanes, tetramethyl tetraphenylcyclotetrasiloxanes, octaphenylcyclotetrasiloxane.

The organosiloxane monomers can be used alone or in the form of mixtures with 2 or more monomers. The silicone rubber preferably contains no less than 50 wt. % and particularly preferably no less than 60 wt. % of organosiloxane, relative to the total weight of the silicone rubber component.

Silane-based crosslinking agents with a functionality of 3 or 4, particularly preferably 4, are preferably used as crosslinking or branching agents (IV). Trimethoxymethylsilane, triethoxyphenylsilane, tetramethoxysilane, tetraethoxysilane, tetra-n-propoxysilane and tetrabutoxysilane are preferably cited by way of example. The crosslinking agent can be used alone or in a mixture of two or more. Tetraethoxysilane is particularly preferred.

The crosslinking agent is used in a quantity range of between 0.1 and 40.0 wt. %, relative to the total weight of the silicone rubber component. The amount of crosslinking agent is chosen such that the degree of swelling of the silicone rubber, measured in toluene, is between 3 and 30, preferably between 3 and 25 and particularly preferably between 3 and 15. The degree of swelling is defined as the weight ratio between the amount of toluene absorbed by the silicone rubber when it is saturated with toluene at 25° C. and the amount of silicone rubber in the dry state. The determination of the degree of swelling is described in detail in EP 249964.

If the degree of swelling is less than 3, in other words if the content of crosslinking agent is too high, the silicone rubber may not have sufficient rubber elasticity. If the swelling index is greater than 30, the silicone rubber in some cases, may not form a domain structure in the matrix polymer and thus also it may be difficult to improve impact resistance; the effect might then be similar to a simple addition of polydimethyl siloxane.

Tetrafunctional crosslinking agents are preferred over trifunctional crosslinking agents because the degree of swelling can then be controlled more easily within the aforementioned limits.

Compounds which are capable of forming structures of the following formulae are suitable as grafting agents (V):

$$CH_2=C(R^9)-COO-(CH_2)_p-SiR^{10}{}_nO_{(3-n)/2} \quad (V-1)$$

$$CH_2=CH-SiR^{10}{}_nO_{(3-n)/2} \quad (V-2) \text{ or}$$

$$HS-(CH_2)_p-SiR^{10}{}_nO_{(3-n)/2} \quad (V-3),$$

in which
$R^9$ denotes hydrogen or methyl,
$R^{10}$ denotes $C_1$-$C_4$ alkyl, preferably methyl, ethyl or propyl, or phenyl,
n denotes 0, 1 or 2 and
p denotes a whole number from 1 to 6.

Acryloyl or methacryloyl oxysiloxanes are particularly suitable for forming the aforementioned structure (V-1) and have a high graft efficiency. This ensures an effective formation of graft chains and thus promotes the impact resistance of the resulting resin composition.

The following are preferably cited by way of example: β-methacryloyloxyethyl dimethoxymethylsilane, γ-methacryloyloxypropyl methoxydimethylsilane, γ-methacryloyloxypropyl dimethoxymethylsilane, γ-methacryloyloxypropyl trimethoxysilane, γ-methacryloyloxypropyl ethoxydiethylsilane, γ-methacryloyloxypropyl diethoxymethylsilane, δ-methacryloyloxybutyl diethoxymethylsilanes or mixtures thereof.

0 to 20 wt. % of grafting agent is preferably used relative to the total weight of the silicone rubber.

The silicone rubber can be produced by emulsion polymerisation, as described for example in U.S. Pat. No. 2,891,920 and U.S. Pat. No. 3,294,725. The silicone rubber is precipitated here in the form of an aqueous latex. To this end a mixture containing organosiloxane, crosslinking agent and optionally grafting agent is mixed with water while shearing, for example using a homogeniser, in the presence of an emulsifier based on sulfonic acid, such as for example alkylbenzene sulfonic acid or alkyl sulfonic acid, wherein the mixture polymerises to form silicone rubber latex. An alkylbenzene sulfonic acid is particularly suitable, as it acts not only as an emulsifier but also as a polymerisation initiator. In this case a combination of sulfonic acid with a metal salt of an alkylbenzene sulfonic acid or with a metal salt of an alkyl sulfonic acid is favourable, since in this way the polymer is stabilised during the subsequent graft polymerisation.

After polymerisation the reaction is terminated by neutralising the reaction mixture by the addition of an aqueous alkaline solution, for example by the addition of an aqueous sodium hydroxide, potassium hydroxide or sodium carbonate solution.

Suitable polyalkyl (meth)acrylate rubber components B.2.2 of the silicone-acrylate composite rubbers according to B.2 can be produced from methacrylic acid alkyl esters and/or acrylic acid alkyl esters, a crosslinking agent (IV) and a grafting agent (V). Preferred methacrylic acid alkyl esters and/or acrylic acid alkyl esters by way of example are the $C_1$-$C_8$ alkyl esters, for example methyl, ethyl, n-butyl, t-butyl, n-propyl, n-hexyl, n-octyl, n-lauryl and 2-ethylhexyl ester; haloalkyl esters, preferably halo $C_1$-$C_8$ alkyl esters, such as chloroethyl acrylate, and mixtures of these monomers. n-Butyl acrylate is particularly preferred.

Monomers having more than one polymerisable double bond can be used as crosslinking agents (IV) for the polyalkyl (meth)acrylate rubber component of the silicone-acrylate rubber. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Preferred grafting agents (V) by way of example are allyl methacrylate, triallyl cyanurate, triallyl isocyanurate or mixtures thereof. Allyl methacrylate can also be used as the crosslinking agent (IV). The grafting agents can be used alone or in mixtures of at least two grafting agents.

The amount of crosslinking agent (IV) and grafting agent (V) is 0.1 to 20 wt. %, relative to the total weight of the polyalkyl (meth)acrylate rubber component of the silicone-acrylate rubber.

The silicone-acrylate composite rubber is produced by first producing the silicone rubber according to B.2.1 as an aqueous latex. This latex is then enriched with the methacrylic acid alkyl esters and/or acrylic acid alkyl esters to be used, the crosslinking agent (IV) and the grafting agent (V), and a polymerisation is performed. A radically initiated emulsion polymerisation is preferred, for example by means of a peroxide, azo or redox initiator. The use of a redox initiator system is particularly preferred, specifically a sulfoxylate initiator system produced by combining iron sulfate, disodium methylene diamine tetraacetate, rongalite and hydroperoxide.

The grafting agent (V) used in the production of the silicone rubber causes the polyalkyl (meth)acrylate rubber component to be covalently bonded to the silicone rubber component. During polymerisation the two rubber components interpenetrate and thus form the composite rubber, which after polymerisation may no longer be able to be separated into its constituents of silicone rubber component and polyalkyl (meth)acrylate rubber component.

To produce the silicone-acrylate composite graft rubbers B cited as component B) the monomers B.1 are grafted onto the rubber base B.2.

The polymerisation methods described for example in EP 249964, EP 430134 and U.S. Pat. No. 4,888,388 can be used here.

The graft polymerisation takes place for example by the following polymerisation method: The desired vinyl monomers B.1 are polymerised onto the graft base in the form of an aqueous latex in a radically initiated single- or multi-stage emulsion polymerisation. The graft efficiency should in many cases be as high as possible and is preferably greater than or equal to 10%. The graft efficiency is largely dependent on the grafting agent (V) used. Following polymerisation to form the silicone (acrylate) graft rubber, the aqueous latex is poured into hot water, in which metal salts such as for example calcium chloride or magnesium sulfate had been previously dissolved. The silicone (acrylate) graft rubber coagulates and can then be separated.

The methacrylic acid alkyl ester and acrylic acid alkyl ester graft rubbers cited as component B) are available commercially. Examples which can be cited include Metablen® SX 005, Metablen® S-2030 and Metablen® SRK 200 from Mitsubishi Rayon Co. Ltd.

Component C

The compositions according to the invention furthermore contain flame retardants, these being preferably selected from the group which includes phosphorus-containing flame retardants and halogenated flame retardants.

Phosphorus-containing flame retardants are particularly preferred, wherein these phosphorus-containing flame retardants are selected from the groups of monomeric and oligomeric phosphates and phosphonates, phosphonate amines, phosphazenes and phosphinic acid salts, wherein mixtures of several components selected from one or more of these groups can also be used as flame retardants. Other halogen-free phosphorus compounds not specifically mentioned here can also be used alone or in any combination with other halogen-free phosphorus compounds.

Preferred monomeric and oligomeric phosphates or phosphonates are phosphorus compounds of the general formula (VI)

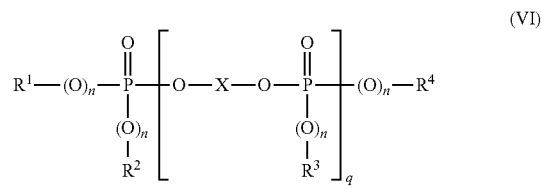

in which
$R^1$, $R^2$, $R^3$ and $R^4$ independently of one another denote optionally halogenated $C_1$ to $C_8$ alkyl, each optionally substituted with alkyl, preferably $C_1$ to $C_4$ alkyl, and/or halogen, preferably chlorine, bromine, substituted $C_5$ to $C_6$ cycloalkyl, $C_6$ to $C_{20}$ aryl or $C_7$ to $C_{12}$ aralkyl,
n independently denotes 0 or 1,
q denotes 0 to 30 and
X denotes a mono- or polynuclear aromatic radical having 6 to 30 C atoms, or a linear or branched aliphatic radical having 2 to 30 C atoms, which can be OH-substituted and can contain up to 8 ether bonds.
$R^1$, $R^2$, $R^3$ and $R^4$ preferably independently of one another denote $C_1$ to $C_4$ alkyl, phenyl, naphthyl or phenyl $C_1$-$C_4$ alkyl. The aromatic groups $R^1$, $R^2$, $R^3$ and $R^4$ can in turn be substituted with halogen and/or alkyl groups, preferably chlorine, bromine and/or $C_1$ to $C_4$ alkyl. Particularly preferred aryl radicals are cresyl, phenyl, xylenyl, propyl phenyl or butyl phenyl and the corresponding brominated and chlorinated derivatives thereof.

X in formula (VI) preferably denotes a mono- or polynuclear aromatic radical having 6 to 30 C atoms. This is preferably derived from diphenols of formula (I).
n in formula (VI) can independently be 0 or 1, with n preferably being equal to 1.
q (also in formula VII) denotes whole numbers from 0 to 30, preferably 0 to 20, particularly preferably 0 to 10, in the case of mixtures it denotes average values of 0.8 to 5.0, preferably 1.0 to 3.0, more preferably 1.05 to 2.00 and particularly preferably 1.08 to 1.60.
X particularly preferably denotes

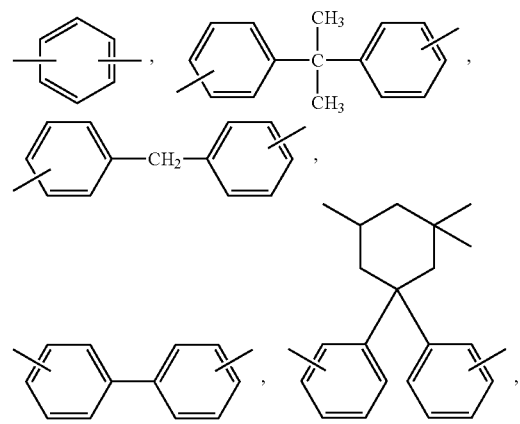

or chlorinated or brominated derivatives thereof, in particular X is derived from resorcinol, hydroquinone, bisphenol A or diphenyl phenol. X is particularly preferably derived from bisphenol A.

Phosphorus compounds of formula (VI) are in particular tributyl phosphate, triphenyl phosphate, tricresyl phosphate, diphenyl cresyl phosphate, diphenyl octyl phosphate, diphenyl-2-ethyl cresyl phosphate, tri(isopropylphenyl)phosphate, resorcinol-bridged oligophosphate and bisphenol A-bridged oligophosphate. The use of oligomeric phosphates esters of formula (VI) derived from bisphenol A is preferred in particular.

Bisphenol A-based oligophosphate according to formula (VIa) is most preferred as component C

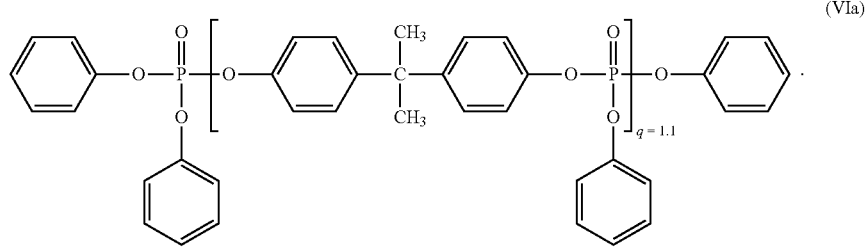

(VIa)

In an alternative preferred embodiment component C is resorcinol-based oligophosphate according to formula (VIb)

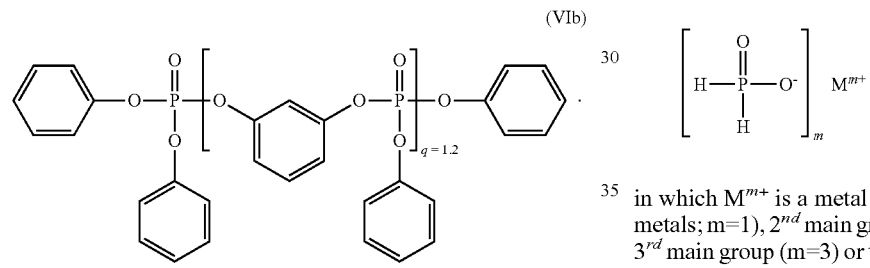

(VIb)

The phosphorus compounds according to component C are known (cf. for example EP-A 0 363 608, EP-A 0 640 655) or can be produced by known methods in an analogous manner (e.g. Ullmanns Enzyklopädie der technischen Chemie, vol. 18, p. 301 ff. 1979; Houben-Weyl, Methoden der organischen Chemie, vol. 12/1, p. 43; Beilstein vol. 6, p. 177).

Mixtures of phosphates with a different chemical structure and/or with the same chemical structure and a different molecular weight can also be used as component C according to the invention.

Mixtures with the same structure and a different chain length are preferably used, wherein the specified q value is the average q value. The average q value can be determined by determining the composition of the phosphorus compound (molecular weight distribution) by means of a suitable method (gas chromatography (GC), high-pressure liquid chromatography (HPLC), gel permeation chromatography (GPC)) and using this to calculate the average values for q.

Phosphonate amines and phosphazenes as described in WO 00/00541 and WO 01/18105 can also be used as flame retardants.

The flame retardants can be used alone or in any combination with one another or mixed with other flame retardants.

Other preferred flame retardants within the meaning of the invention are salts of a phosphinic acid with any metal cations. Mixtures of salts which differ in their metal cation can also be used. The metal cations are the cations of metals of the $1^{st}$ main group (alkali metals, preferably $Li^+$, $Na^+$, $K^+$), the $2^{nd}$ main group (alkaline-earth metals; preferably $Mg^{2+}$, $Ca^{2+}$, $Sr^{2+}$, $Ba^{2+}$, particularly preferably $Ca^{2+}$) or the $3^{rd}$ main group (elements of the boron group; preferably $Al^{3+}$) and/or the $2^{nd}$, $7^{th}$ or $8^{th}$ subgroup (preferably $Zn^{2+}$, $Mn^{2+}$, $Fe^{2+}$, $Fe^{3+}$) of the periodic table.

A salt or a mixture of salts of a phosphinic acid of formula (IX) is preferably used,

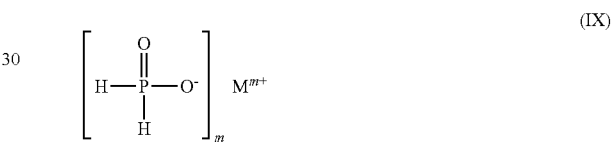

(IX)

in which $M^{m+}$ is a metal cation of the $1^{st}$ main group (alkali metals; m=1), $2^{nd}$ main group (alkaline-earth metals; m=2) or $3^{rd}$ main group (m=3) or the $2^{nd}$, $7^{th}$ or $8^{th}$ subgroup (wherein m denotes a whole number from 1 to 6, preferably 1 to 3 and particularly preferably 2 or 3) of the periodic table.

Particularly preferred in formula (IX) are for m=1 the metal cations $M^+ = Li^+$, $Na^+$, $K^+$, for m=2 the metal cations $M^{2+} = Mg^{2+}$, $Ca^{2+}$, $Sr^{2+}$, $Ba^{2+}$ and for m=3 the metal cations $M^{3+} = Al^{3+}$, with $Ca^{2+}$ (m=2) and $Al^{3+}$ (m=3) being most preferred.

In a preferred embodiment the average particle size $d_{50}$ of the phosphinic acid salt (component C) is less than 80 μm, preferably less than 60 μm, with $d_{50}$ particularly preferably being between 10 μm and 55 μm. The average particle size $d_{50}$ is the diameter above and below which respectively 50 wt. % of the particles lie. Mixtures of salts which differ in their average particle size $d_{50}$ can also be used.

These requirements of the particle size are in each case linked to the technical effect whereby the flame retardant efficiency of the phosphinic acid salt is increased.

The phosphinic acid salt can be used either alone or in combination with other phosphorus-containing flame retardants.

Component D

The compositions according to the invention can optionally contain fluorinated polyolefins D as an antidripping agent. Fluorinated polyolefins are generally known (cf. for example EP-A 640 655). An example of a commercial product is Teflon® 30 N from DuPont.

The fluorinated polyolefins can also be used in the form of a coagulated mixture of emulsions of the fluorinated polyolefins with emulsions of the graft polymers B) or an emulsion of a copolymer E.1), preferably based on styrene-acrylonitrile or polymethyl methacrylate, wherein the fluorinated polyolefin is mixed as an emulsion with an emulsion of the graft polymer or (co)polymer and then coagulated.

The fluorinated polyolefins can moreover be used as a precompound with the graft polymer B) or a copolymer E.1), preferably based on styrene-acrylonitrile or polymethyl methacrylate. The fluorinated polyolefins are mixed as a powder with a powder or granules of the graft polymer or copolymer and compounded in the melt, generally at temperatures of 200 to 330° C., in conventional units such as internal mixers, extruders or twin-shaft screws.

The fluorinated polyolefins can also be used in the form of a masterbatch, which is produced by emulsion polymerisation of at least one monoethylenically unsaturated monomer in the presence of an aqueous dispersion of the fluorinated polyolefin. Preferred monomer components are styrene, acrylonitrile, polymethyl methacrylate and mixtures thereof. After acid precipitation and subsequent drying the polymer is used as a free-flowing powder.

The coagulates, precompounds or masterbatches conventionally have solids contents of fluorinated polyolefin of 5 to 95 wt. %, preferably 7 to 60 wt. %.

Component E

Component E comprises one or more thermoplastic vinyl (co)polymers E.1 and/or polyalkylene terephthalates E.2.

Polymers of at least one monomer from the group of vinyl aromatics, vinyl cyanides (unsaturated nitriles), unsaturated carboxylic acids and derivatives (such as anhydrides and imides) of unsaturated carboxylic acids are suitable as vinyl (co)polymers E.1. Particularly suitable are (co)polymers of E.1.1 50 to 99, preferably 60 to 80 parts by weight of vinyl aromatics and/or ring-substituted vinyl aromatics (such as styrene, α-methylstyrene, p-methylstyrene, p-chlorostyrene), and E.1.2 1 to 50, preferably 20 to 40 parts by weight of vinyl cyanides (unsaturated nitriles, such as acrylonitrile and methacrylonitrile) and/or unsaturated carboxylic acids (such as maleic acid) and/or derivatives (such as anhydrides and imides) of unsaturated carboxylic acids (for example maleic anhydride and N-phenyl maleinimide).

The vinyl (co)polymers E.1 are resin-like, thermoplastic and rubber-free. The copolymer of E.1.1 styrene and E.1.2 acrylonitrile is particularly preferred.

The (co)polymers according to E.1 are known and can be produced by radical polymerisation, in particular by emulsion, suspension, solution or bulk polymerisation. The (co)polymers preferably have average molecular weights Mw (weight-average, determined by light scattering or sedimentation) of between 15,000 and 200,000.

The polyalkylene terephthalates of component E.2 are reaction products of aromatic dicarboxylic acids or reactive derivatives thereof, such as dimethyl esters or anhydrides, and aliphatic, cycloaliphatic or araliphatic diols and mixtures of these reaction products. Preferred polyalkylene terephthalates contain at least 80 wt. %, preferably at least 90 wt. %, relative to the dicarboxylic acid component, of terephthalic acid radicals and at least 80 wt. %, preferably at least 90 mol %, relative to the diol component, of ethylene glycol and/or butanediol-1,4 radicals.

The preferred polyalkylene terephthalates can contain in addition to terephthalic acid esters up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as for example radicals of phthalic acid, isophthalic acid, naphthalene-2,6-dicarboxylic acid, 4,4'-diphenyl dicarboxylic acid, succinic acid, adipic acid, sebacic acid, azelaic acid, cyclohexane diacetic acid.

The preferred polyalkylene terephthalates can contain, in addition to ethylene glycol or butanediol-1,4 radicals, up to 20 mol %, preferably up to 10 mol %, of other aliphatic diols having 3 to 12 C atoms or cycloaliphatic diols having 6 to 21 C atoms, for example radicals of propanediol-1,3,2-ethyl propanediol-1,3, neopentyl glycol, pentanediol-1,5, hexanediol-1,6, cyclohexane dimethanol-1,4,3-ethyl pentanediol-2,4,2-methyl pentanediol-2,4,2,2,4-trimethyl pentanediol-1,3,2-ethyl hexanediol-1,3,2,2-diethyl propanediol-1,3, hexanediol-2,5,1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(4-β-hydroxyethoxyphenyl) propane and 2,2-bis-(4-hydroxypropoxyphenyl)propane (DE-A 2 407 674, 2 407 776, 2 715 932).

The polyalkylene terephthalates can be branched by the incorporation of relatively small amounts of trihydric or tetrahydric alcohols or tribasic or tetrabasic carboxylic acids, as described for example in DE-A 1 900 270 and U.S. Pat. No. 3,692,744. Examples of preferred branching agents are trimesic acid, trimellitic acid, trimethylolethane, trimethylolpropane and pentaerythritol.

Polyalkylene terephthalates produced solely from terephthalic acid and reactive derivatives thereof (for example dialkyl esters thereof) and ethylene glycol and/or butanediol-1,4, and mixtures of these polyalkylene terephthalates, are particularly preferred.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be produced by known methods (see for example Kunststoff-Handbuch, volume VIII, p. 695 ff., Carl-Hanser-Verlag, Munich 1973).

Further Additives F

The moulding compositions according to the invention can optionally contain at least one further of the conventional additives, such as for example lubricants and release agents, nucleating agents, antistatics, stabilisers, dyes and pigments as well as fillers and reinforcing agents.

Component F also comprises extremely fine-particle inorganic compounds having an average particle diameter of less than or equal to 200 nm, preferably less than or equal to 150 nm, in particular 1 to 100 nm. Suitable extremely fine-particle inorganic compounds preferably consist of at least one polar compound of one or more metals of the $1^{st}$ to $5^{th}$ main group or $1^{st}$ to $8^{th}$ subgroup of the periodic table, preferably the $2^{nd}$ to $5^{th}$ main group or $4^{th}$ to $8^{th}$ subgroup, particularly preferably the $3^{rd}$ to $5^{th}$ main group or $4^{th}$ to $8^{th}$ subgroup, or of compounds of these metals with at least one element selected from oxygen, hydrogen, sulfur, phosphorus, boron, carbon, nitrogen or silicon. Preferred compounds are for example oxides, hydroxides, hydrous oxides, sulfates, sulfites, sulfides, carbonates, carbides, nitrates, nitrites, nitrides, borates, silicates, phosphates, hydrides, phosphites or phosphonates. The extremely fine-particle inorganic compounds preferably consist of oxides, phosphates, hydroxides, preferably $TiO_2$, $SiO_2$, $SnO_2$, ZnO, ZnS, boehmite, $ZrO_2$, $Al_2O_3$, aluminium phosphates, iron oxides, also TiN, WC, AlO(OH), $Fe_2O_3$ iron oxides, $NaSO_4$, vanadium oxides, zinc borate, silicates such as Al silicates, Mg silicates, one-, two-, three-dimensional silicates and talc. Mixtures and doped compounds can likewise be used. These extremely fine-particle inorganic compounds can furthermore be surface-modified with organic molecules in order to achieve a better compatibility with the polymers. Hydrophobic or hydrophilic surfaces can be produced in this way. Hydrate-containing aluminium oxides (e.g. boehmite) or $TiO_2$ are particularly preferred.

Particle size and particle diameter of the inorganic particles denote the average particle diameter $d_{50}$, determined by sedimentation measurements via the sedimentation rate of the particles in a SediGraph, for example.

The inorganic compounds can take the form of powders, pastes, sols, dispersions or suspensions. Powders can be obtained from dispersions, sols or suspensions by precipitation. The inorganic compounds can be incorporated into the thermoplastic moulding compositions by conventional methods, for example by direct compounding or extrusion of moulding compositions and the extremely fine-particle inorganic compounds. Preferred methods are the production of a masterbatch, for example in flame retardant additives and at least one component of the moulding compositions according to the invention in monomers or solvents, or the coprecipitation of a thermoplastic component and the extremely fine-particle inorganic compounds, for example by coprecipitation of an aqueous emulsion and the extremely fine-particle inorganic compounds, optionally in the form of dispersions, suspensions, pastes or sols of the extremely fine-particle inorganic materials.

The compositions according to the present inventions are produced by mixing the individual constituents in a known manner and melt-compounding and melt-extruding them at temperatures of 200° C. to 300° C. in conventional units such as internal mixers, extruders and twin-shaft screws. Mixing of the individual constituents can take place in a known manner either successively or simultaneously and both at around 20° C. (room temperature) and at elevated temperature.

By virtue of their outstanding balance of high impact resistance at low temperatures, good flame resistance with low wall thicknesses and excellent chemical resistance, the thermoplastic compositions and moulding compositions according to the present invention are suitable for producing battery boxes according to the invention.

The invention likewise provides processes for producing the battery boxes and the use of the moulding compositions for the production of battery boxes. The moulding compositions can be processed to form battery boxes by means of injection moulding. The invention also provides the production of battery boxes by thermoforming from prefabricated sheets or films.

The battery boxes are suitable for any application including the following applications: vehicle batteries and rechargeable batteries, battery boxes for motor vehicles, buses, lorries, caravans, rail vehicles, aircraft, watercraft or other vehicles, static batteries, for example in buildings for an emergency power supply or for the storage of solar energy from photovoltaic installations. The battery boxes preferably meet the requirements of the UN 3480 transport test.

Examples of battery boxes according to the invention are illustrated in FIGS. 1 and 2.

FIG. 1A shows a battery box for flat battery cells with a gap between the insertion slots for the flat cells, in which a coolant can be placed or in which a coolant circulates.

FIG. 1B shows a top view of the battery box for flat battery cells.

FIG. 1C shows a cross-sectional view (cross-section AA) through the battery box for flat battery cells.

FIG. 2A shows a battery box for cylindrical battery cells with a gap between the insertion slots for the cylindrical cells, in which a coolant can be placed or in which a coolant circulates.

Figure 2B:
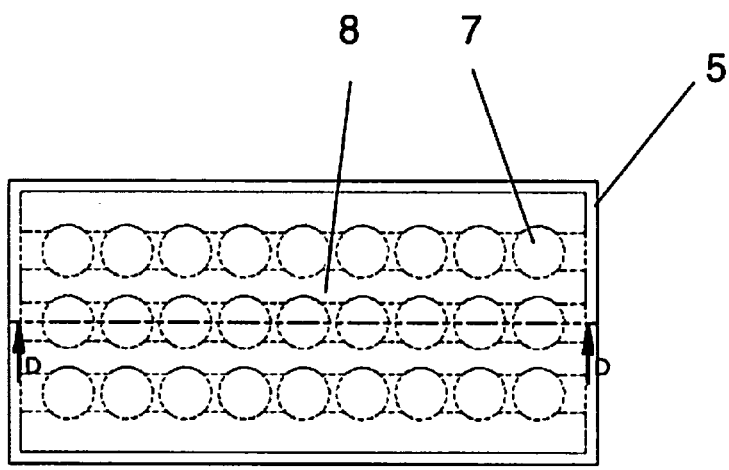
FIG. 2B shows a top view of the battery box for cylindrical battery cells.

FIG. 2B shows a top view of the battery box for cylindrical battery cells.

Figure 2C:
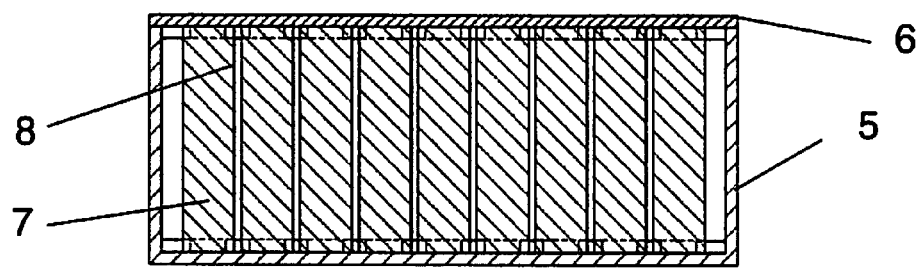
FIG. 2C shows a cross-sectional view (cross-section DD) through the battery box for cylindrical battery cells.

FIG. 2C shows a cross-sectional view (cross-section DD) through the battery box for cylindrical battery cells.

The references in the figures have the following meaning:

1, 5=box 2, 6=cover 3, 7=insertion slot for flat cell (FIG. 1) or cylindrical cell (FIG. 2)

4, 8=gap between cells for cooling medium

In a preferred embodiment the battery box has channels for cooling the individual cells, preferably water/glycol or air cooling.

In an alternative embodiment the battery box consists of an outer box and an inner insert to hold the individual cells, wherein the outer box can optionally be insulated, for example by means of a double wall. The outer box and the cell holder (insertion slots) are preferably manufactured from a single material and more preferably from a single component (one-piece construction).

Several battery boxes can preferably be expanded in a modular manner to obtain larger units.

In a further preferred embodiment the battery box contains a holder for electronic controls.

The examples below serve to further clarify the invention.

EXAMPLES

Component A-1

Linear polycarbonate based on bisphenol A with a relative solution viscosity of $\eta_{rel}$=1.28 measured in $CH_2Cl_2$ as solvent at 25° C. and at a concentration of 0.5 g/100 ml.

Component B-1

Silicone-acrylate composite rubber with the following composition:

Polymethyl methacrylate/silicone rubber/acrylate rubber: 14/31/55 wt. %

Component B-2

Silicone-acrylate composite rubber with the following composition:

Polymethyl methacrylate/silicone rubber/acrylate rubber: 11/82/7 wt. %

Component C

Bisphenol A-based oligophosphate (Reofoss BAPP) according to formula (VIa)

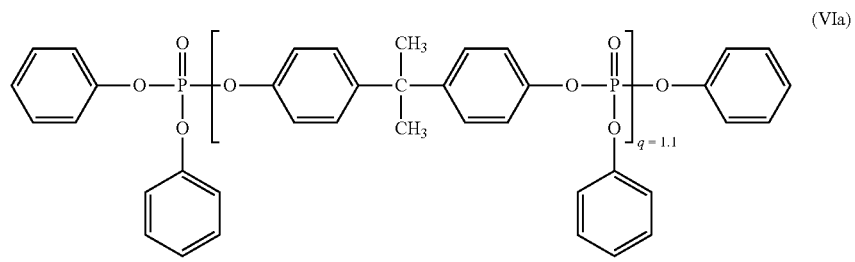

(VIa)

Component D

Polytetrafluorethylene powder, CFP 6000 N, Du Pont.

Component F

F-1: Pentaerythritol tetrastearate as lubricant/release agent

F-2: Phosphite stabiliser, Irganox® B900 (mixture of 80% Irgafos® 168 and 20% Irganox® 1076; BASF AG; Ludwigshafen/Irgafos® 168 (tris(2,4-di-tert-butylphenyl)phosphite)/Irganox® 1076 (2,6-di-tert-butyl-4-(octadecanoxycarbonylethyl)phenol).

The materials listed in Table 1 are compounded and granulated in a twin-screw extruder (ZSK-25) (Werner & Pfleiderer) at a speed of 225 rpm and a throughput of 20 kg/h at a machine temperature of 260° C. The finished granules are processed in an injection moulding machine to form the corresponding test pieces (composition temperature 240° C., mould temperature 80° C., melt front velocity 240 mm/s).

The following methods were used to characterise the properties of the test pieces:

The flowability was determined in accordance with ISO 11443 (melt viscosity).

The notched impact resistance ak was measured in accordance with ISO 180/1A on a specimen injection-moulded on one side and measuring 80×10×4 mm, at the specified measuring temperatures.

The heat resistance was measured in accordance with DIN ISO 306 (Vicat softening temperature, method B, with a 50 N load and at a heating rate of 120 K/h) on a specimen injection-moulded on one side and measuring 80×10×4 mm.

The fire behaviour is measured in accordance with UL 94V on specimens measuring 127×12.7×1.5 mm.

The ultimate elongation and tensile modulus of elasticity were measured in accordance with DIN EN ISO 527 on specimens measuring 170.0×10.0×4.0 mm.

Under chemical resistance (ESC behaviour), the time to fracture at 2.4% outer fibre strain following storage of the test piece in the given test substances at room temperature is stated for a specimen injection-moulded on one side and measuring 80×10×4 mm.

TABLE

Compositions and their properties

| Components | wt. % | 1 | 2 | 3 | 4 |
|---|---|---|---|---|---|
| A1 | | 84.10 | 78.10 | 84.10 | 78.10 |
| B1 | | | | 9.00 | 11.00 |
| B2 | | 9.00 | 11.00 | | |
| C | | 6.00 | 10.00 | 6.00 | 10.00 |
| D | | 0.40 | 0.40 | 0.40 | 0.40 |
| F1 | | 0.40 | 0.40 | 0.40 | 0.40 |
| F2 | | 0.10 | 0.10 | 0.10 | 0.10 |
| Total | | 100.00 | 100.00 | 100.00 | 100.00 |

| Properties | units | | | | |
|---|---|---|---|---|---|
| ak ISO 180/1A at RT | [kJ/m²] | 59 | 57 | 60 | 58 |
| ak ISO 180/1A at −20° C. | [kJ/m²] | 45 | 42 | 42 | 37 |
| ak ISO 180/1A at −40° C. | [kJ/m²] | 32 | 30 | 20 | 18 |
| Vicat B 120 | [° C.] | 120 | 109 | 120 | 109 |
| UL 94 V/1.5 mm | | V-0 | V-0 | V-0 | V-0 |
| Burning time | [s] | 10 | 12 | 20 | 16 |
| Melt viscosity 260° C./1000 s-1 | [Pas] | 370 | 297 | 366 | 292 |
| ESC at 2.4%, toluene/ isopropanol (60:40) | h:min | 14:08 | 30:00 | 7:00 | 14:36 |
| ESC at 2.4%, rapeseed oil | h:min | 7:45 | 2:45 | 7:00 | 2:39 |
| ESC at 2.4%, glycol/water (50:50) | h:min | 125:50 | 124:00 | 122:20 | 67:00 |
| ESC at 2.4%, hydraulic oil | h:min | 168:00 | 168:00 | 168:00 | 168:00 |
| Tensile modulus of elasticity | N/mm² | 2248 | 2258 | 2242 | 2263 |
| Ultimate elongation | % | 106 | 110 | 103 | 110 |

The invention claimed is:

1. A battery box comprising a composition consisting of
   A) 77.0 to 85.0 parts by weight, relative to the sum of parts by weight of components A+B+C, of linear or branched aromatic polycarbonate or aromatic polyester carbonate,
   B) 9.0 to 11.0 parts by weight, relative to the sum of parts by weight of components A+B+C, of at least one graft polymer with
      B.1 10 to 20 wt. %, relative in each case to the graft polymer B, of a shell comprising at least one vinyl monomer and
      B.2 80 to 90 wt. %, relative in each case to the graft polymer B, of one or more graft bases comprising silicone-acrylate composite rubber, C) 4.0 to 11.0 parts by weight, relative to the sum of parts by weight of components A+B+C, of one or more phosphorus compound according to formula (VII),

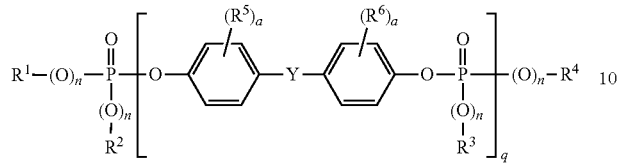

(VII)

in which
R$^1$, R$^2$, R$^3$ and R$^4$ independently of each other denote C$_1$-C$_8$ alkyl, optionally substituted with halogen, C$_5$-C$_6$ cycloalkyl, C$_6$-C$_{10}$ aryl or C$_7$-C$_{12}$ aralkyl, each optionally substituted with halogen and/or alkyl,
n independently denotes 0 or 1,
a independently denotes 0, 1, 2, 3 or 4,
q denotes 0 to 30
R$^5$ and R$^6$ independently of each other denote C$_1$-C$_4$ alkyl, preferably methyl, or halogen, and
Y denotes C$_1$-C$_7$ alkylidene, C$_1$-C$_7$ alkylene, C$_5$-C$_{12}$ cycloalkylene, C$_5$-C$_{12}$ cycloalkylidene, —O—, —S—, —SO—, —SO$_2$— or —CO—,
D) 0.1 to 0.6 parts by weight, relative to the sum of parts by weight of components A+B+C, of one or more antidripping agents,
and
F) 0.2 to 5.0 parts by weight, relative to the sum of parts by weight of components A+B+C, of at least one additive selected from the group consisting of lubricants and release agents, nucleating agents, antistatics, stabilisers, dyes, pigments, fillers, reinforcing agents, and extremely fine-particle inorganic compounds, wherein the extremely fine-particle inorganic compounds have an average particle diameter of less than or equal to 200 nm,
wherein the composition is free from thermoplastic vinyl (co)polymer (E.1) and polyalkylene terephthalate (E.2), and is optionally free from rubber-free polyalkyl(alkyl) acrylate, and wherein all stated parts by weight are standardised such that the sum of parts by weight of components A+B+C in the composition is 100.

2. Battery box according to claim 1, comprising as component C, a mixture of a monophosphate and an oligophosphate according to formula (VII), wherein the average value of q is 1.06 to 1.15.

3. Battery box according to claim 1, wherein the battery box has an outer box and an inner insert to hold the individual cells.

4. Battery box according to claim 1, wherein the battery box has channels for cooling the individual cells.

5. A process for producing a battery box according to claim 1, comprising injection molding and/or thermoforming said composition.

6. The battery box according to claim 1, wherein component B.1 is methylene methacrylate.

7. The battery box according to claim 1, wherein the graft base B.2 has a d$_{50}$ value of 0.05 to 10 µm.

8. The battery box according to claim 1, wherein the composition is free from rubber-free polyalkyl(alkyl)acrylate.

9. The battery box according to claim 1, wherein component A has a relative solution viscosity in the range from 1.18 to 1.40.

* * * * *